United States Patent [19]

Morton et al.

[11] 4,250,437
[45] Feb. 10, 1981

[54] FIELD WEAKENING CIRCUITS FOR ELECTRIC MOTORS

[75] Inventors: John Morton; Keith D. Stevens, both of Stockport, England

[73] Assignee: Cableform Limited, Stockport, England

[21] Appl. No.: 30,790

[22] Filed: Apr. 17, 1979

[30] Foreign Application Priority Data

Apr. 17, 1978 [GB] United Kingdom .............. 14926/78

[51] Int. Cl.³ .............................................. H02P 5/16
[52] U.S. Cl. .................................... 318/357; 318/533
[58] Field of Search .............. 318/357, 358, 359, 533, 318/534, 347, 348, 341, 338

[56] References Cited

U.S. PATENT DOCUMENTS

| | | |
|---|---|---|
| 3,388,306 | 6/1968 | Koppelmann ..................... 318/359 |
| 3,962,612 | 6/1976 | Kawasaki ......................... 318/338 |
| 3,983,465 | 9/1976 | Tsuboi et al. .................... 318/380 |

Primary Examiner—David Smith, Jr.
Attorney, Agent, or Firm—Sughrue, Rothwell, Mion, Zinn and Macpeak

[57] ABSTRACT

A field weakening circuit for an electric motor comprises a switching circuit the impedance of which is variable connected in parallel with a field winding of the motor. The switching circuit impedance is variable in dependence upon motor speed and current, either continuously or in a plurality of discrete steps, to control the current through the field winding.

5 Claims, 8 Drawing Figures

FIELD WEAKENING CIRCUITS FOR ELECTRIC MOTORS

The present invention relates to field weakening circuits for electric motors.

It is well known that the top speed of an electric series motor can be effectively increased by reducing the current through the motor field winding. This has conventionally been achieved by connecting a switch in series with a resistor across the field winding and closing the switch when it is desired to achieve field weakening.

The field weakening switch is controlled so that it automatically opens when the motor armature current rises to an upper threshold level. As soon as the switch is opened, given that the speed and loading of the motor is unchanged, the current rapidly falls to a level determined by the altered characteristics of the motor. The field weakening switch remains open until the motor current falls to a lower threshold level, whereupon the switch automatically closes. When the switch closes, the motor current rapidly rises.

The rapid changes in the motor current when the state of the switch changes cause problems in that when for example the switch closes transient currents can occur which exceed the upper threshold and accordingly re-open the switch. To avoid these problems time delays have been incorporated in field weakening circuits to prevent a change in the state of the field weakening switch until disruptive transient currents caused by an earlier change of state in the switch have died away. This increases circuit complexity and reduces reliability.

It is an object of the present invention to obviate or mitigate the above problems.

According to the present invention, there is provided a field weakening circuit for an electric motor, comprising a switching circuit the impedance of which is variable connected in parallel with a field winding of the motor, and means for controlling the impedance of the switching circuit in dependence upon motor speed and current, wherein the impedance of the switching circuit may be varied continuously or in a plurality of discrete steps.

Preferably the switching circuit comprises at least one semiconductor switch in series with a resistive element. The or each semiconductor switch may be controlled by a train of pulses of variable mark/space ratio or by a ramp voltage of variable slope to provide a continuously variable impedance. Alternatively a plurality of semiconductor switches in series with resistive elements may be arranged in parallel and controlled to turn on at respective motor current levels, whereby the impedance in parallel with the motor field varies in a stepwise manner.

Embodiments of the present invention will now be described by way of example with reference to the accompanying drawings, in which.

Figure 1:
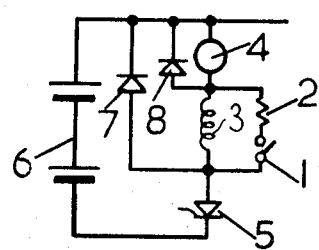
FIG. 1 illustrates a known field weakening circuit.

As shown in FIG. 1 a known field weakening circuit comprises a switch 1 in series with a resistor 2 connected in parallel with a field winding 3 of a motor having an armature 4. The motor is powered by pulses of current applied by a thyristor 5 from a battery 6. Diodes 7 and 8 are connected to the motor in a conventional fashion.

Figure 2:
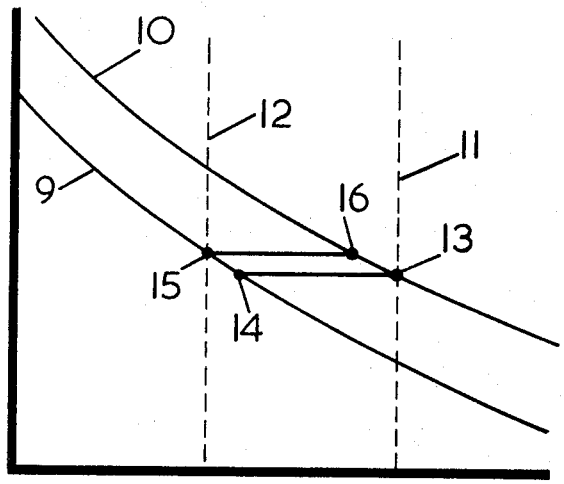
FIG. 2 is a graph illustrating the operation of the circuit shown in FIG. 1.

Referring to FIG. 2, when the switch 1 is open the speed versus current characteristic of the motor follows curve 9. When the switch 1 is closed the characteristic follows curve 10. Thus to achieve high speeds it is desirable to operate the motor on curve 10 when the current is relatively low, and to avoid excessive current drain from the battery in high load conditions it is desirable to operate the motor on curve 9 when the current is relatively high.

It is known to monitor motor current and automatically open switch 1 wherever the current exceeds an upper threshold indicated by dotted line 11 and close switch 1 whenever the current falls below a lower threshold indicated by dotted line 12. In the case of slowing the motor from high speed, the speed/current characteristic follows curve 10 to point 13 whereupon switch 1 closes. The speed and load on the motor does not change instantaneously so the current must fall rapidly to the level of point 14. In the case of increasing the speed of the motor from a low level, the speed/current characteristic follows curve 9 to point 15 whereupon switch 1 opens. The motor speed and load remain substantially the same and so the current rises rapidly to the level of point 16. Thus between the thresholds indicated by lines 11 and 12 the motor characteristic can follow either curve 9 or curve 10 depending upon the direction of the previous excursion of the motor current beyond the thresholds.

When the switch 1 opens or closes a very rapid current change takes place. As a result transient conditions can be established which disrupt the operation of the switch 1. For example, when the current rises from point 15 to point 16 after the switch 1 closes, transient currents could exceed the threshold level 11 causing the switch 1 to re-open. To avoid this happening time delay devices have been used to make the circuit insensitive to transient conditions.

Figure 3:
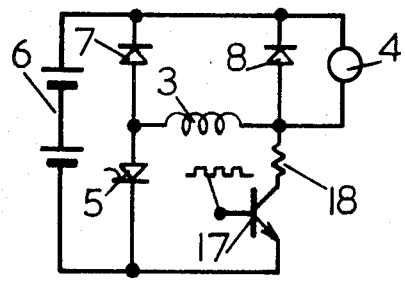
FIGS. 3 and 4 illustrate two embodiments of the present invention.

Referring to FIG. 3, an embodiment of the present invention is illustrated. The known switch 1 and resistor 2 are replaced by a transistor 17 and resistor 18. Pulses are applied to the base of transistor 17 to render it alternately full conductive and full non-conductive, the mean impedance of the switching circuit defined by transistor 17 and resistor 18 depending on the mark/space ratio of the pulses.

Figure 5:
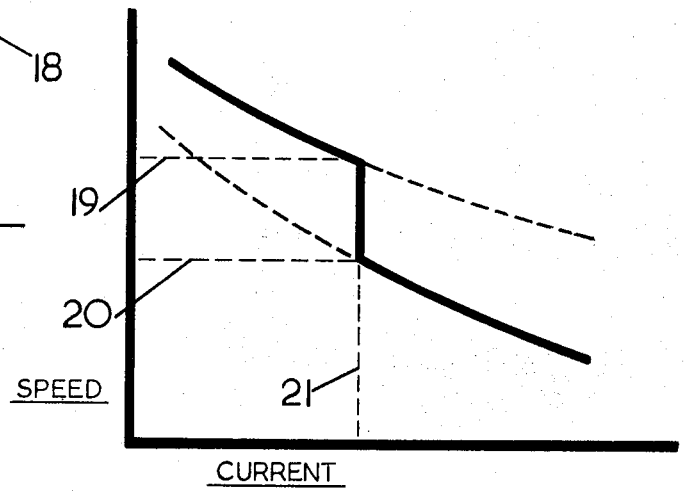
FIG. 5 is a graph illustrating the operation of the embodiment of FIGS. 3 and 4.

Referring to FIG. 5, the operation of FIG. 3 will be described. The motor current and motor speed are monitored and the mark/space ratio of the pulses applied to transistor 17 controlled such that when the speed is above a threshold indicated by dotted line 19 the transistor 17 is always conductive, when the speed is below a threshold indicated by dotted line 20 the transistor 17 is always non-conductive, and when the speed is between the two thresholds the transistor 17 is sufficiently conductive to maintain the current in a single threshold indicated by dotted line 21. It will be appreciated that the motor current cannot exceed threshold 21 when the speed is above threshold 20 and as the motor speed falls from threshold 19 to threshold 20 the motor current is maintained at the threshold 21.

Figure 4:
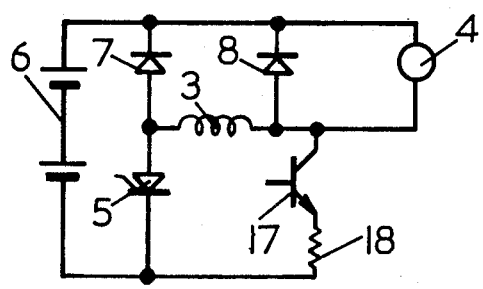

Referring to FIG. 4, the illustrated circuit is the same as the circuit of FIG. 3 except for the reversal of the positions of transistor 17 and resistor 18. The base of transistor 17 receives a ramp voltage signal related to motor speed and current in the same way as the mark/space ratio of the pulse train described with reference to FIG. 3, and the operation of the circuit of FIG. 4 is also illustrated by FIG. 5.

It will be appreciated that more than one switching circuit 17, 18 could be provided in parallel with each other to enable high field weakening currents to be handled by available components.

Figure 6:
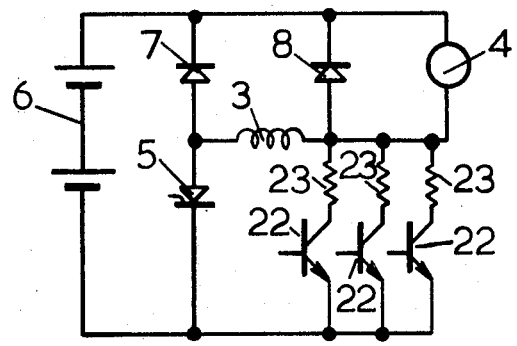
FIG. 6 illustrates a third embodiment of the present invention.

Referring now to FIG. 6, the transistor 17 and resistor 18 of FIGS. 3 and 4 are replaced by three parallel switching circuits each comprising a transistor 22 and a resistor 23. The transistors 22 are arranged to be turned on sequentially as the motor speed falls. This produces the speed/current characteristics of FIGS. 7 and 8.

Figure 7:
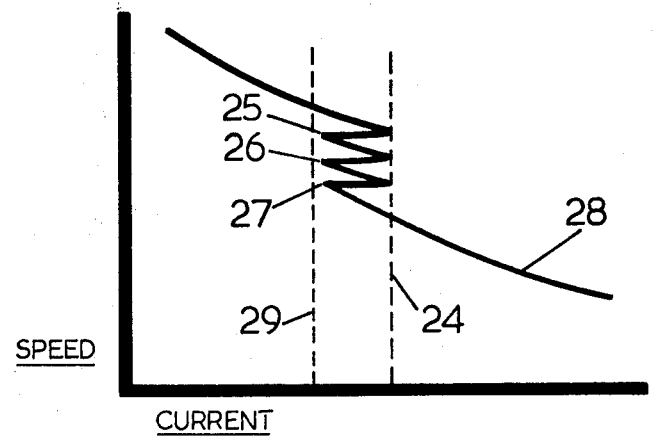
FIGS. 7 and 8 illustrate the operation of the embodiment of FIG. 6.
Figure 8:
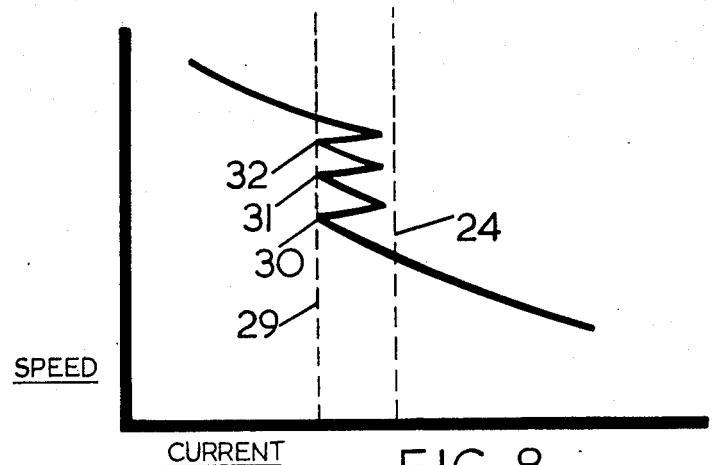

Referring to FIG. 7, as the motor speed falls with all the transistors 22 fully conductive the current rises until it reaches threshold 24. A first one of the transistors 22 then turns off and the current drops to point 25. The speed continues to fall and the current again rises to threshold 24 whereupon a second transistor 22 turns off causing the current to drop to point 26. A further current increase to threshold 24 causes the third transistor 22 to turn off. The current then falls to point 27 and then follows the normal speed/current characteristic 28.

In the case of speed increasing, a similar curve is followed with the transistors 22 turning on sequentially when the current falls to threshold 29 at points 30, 31 and 32. The thresholds 24 and 29 are shown in both FIGS. 7 and 8.

It will be appreciated that the number of transistors 22 can be selected to provide any desired number of stepwise variations in the total switching circuit impedance.

What is claimed is:

1. A power supply circuit for an electric motor including an armature in series with a field winding, comprising: a chopper circuit connected in series between the field winding and a power supply for supplying pulses of current from the power supply to said motor, and a field weakening circuit connected in parallel with the series connected field winding and chopper circuit, said field weakening circuit comprising at least one solid state switch in series with a resistor, wherein the impedance of said field weakening circuit may be controlled by varying the conductivity of said at least one solid state switch.

2. A power supply circuit according to claim 1, comprising means for applying a train of pulses to a control electrode of said at least one solid state switch, the mark/space ratio of the pulse train being controllable to continuously vary the mean impedance of the field weakening circuit.

3. A power supply circuit according to claim 1, comprising means for applying a ramp voltage to a control electrode of said at least one solid state switch, the slope of the ramp voltage being controllable to continuously vary the mean impedance of the field weakening circuit.

4. A power supply circuit according to claim 1, wherein a signal applied to a control electrode of said at least one solid state switch is related to motor current and speed such that the motor current cannot exceed a predetermined threshold current above a first motor speed threshold and such that as the motor speed falls from a second motor speed threshold the motor current is maintained at the threshold current until the motor speed falls to the first motor speed threshold.

5. A power supply circuit according to claim 1, comprising a plurality of solid state switches each in series with a respective resistive element, means for turning off the switches when the motor current rises to a predetermined first threshold and for turning on the switches when the motor current falls to a predetermined second threshold, and means responsive to motor speed for enabling the turning on and off of the switches at respective motor speed thresholds, whereby as the motor speed rises and the motor current falls the switches are turned on in a predetermined sequence and as the motor speed falls and the motor current rises the switches are turned off in a predetermined sequence.

* * * * *